United States Patent
Ahn

(10) Patent No.: US 8,238,288 B2
(45) Date of Patent: Aug. 7, 2012

(54) DUPLICATE DETECTION METHOD FOR AD HOC NETWORK

(75) Inventor: Kyung Hwan Ahn, Daegu Metropolitan (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 883 days.

(21) Appl. No.: 11/964,823

(22) Filed: Dec. 27, 2007

(65) Prior Publication Data

US 2008/0247355 A1 Oct. 9, 2008

(30) Foreign Application Priority Data

Apr. 9, 2007 (KR) .................. 10-2007-0034563

(51) Int. Cl.
*H04W 4/00* (2009.01)
(52) U.S. Cl. .................. 370/328; 370/315
(58) Field of Classification Search .................. None
See application file for complete search history.

(56) References Cited

U.S. PATENT DOCUMENTS

| | | | |
|---|---|---|---|
| 5,034,882 A * | 7/1991 | Eisenhard et al. .............. 712/30 |
| 5,101,402 A * | 3/1992 | Chiu et al. .................. 709/224 |
| 5,396,490 A * | 3/1995 | White et al. .................. 370/474 |
| 5,444,849 A * | 8/1995 | Farrand et al. .................. 709/237 |
| 5,970,391 A * | 10/1999 | Eaton et al. .................. 455/59 |
| 6,563,840 B1 * | 5/2003 | Heo .................. 370/474 |
| 6,587,441 B1 * | 7/2003 | Urban et al. .................. 370/310 |
| 6,907,041 B1 * | 6/2005 | Turner et al. .................. 370/412 |
| RE39,454 E * | 1/2007 | Cantoni et al. .................. 370/473 |
| 7,719,970 B1 * | 5/2010 | Dada et al. .................. 370/230 |
| 7,729,240 B1 * | 6/2010 | Crane et al. .................. 370/229 |
| 2002/0152315 A1 * | 10/2002 | Kagan et al. .................. 709/228 |
| 2003/0135700 A1 * | 7/2003 | Schultz et al. .................. 711/154 |
| 2003/0149772 A1 * | 8/2003 | Hsu et al. .................. 709/227 |
| 2004/0141525 A1 * | 7/2004 | Bhushan et al. .................. 370/473 |
| 2004/0143842 A1 * | 7/2004 | Joshi .................. 725/32 |
| 2004/0174844 A1 * | 9/2004 | Cho et al. .................. 370/328 |
| 2004/0215803 A1 * | 10/2004 | Yamada et al. .................. 709/231 |
| 2004/0233881 A1 * | 11/2004 | Kang et al. .................. 370/338 |
| 2005/0044561 A1 * | 2/2005 | McDonald .................. 725/18 |
| 2005/0078678 A1 * | 4/2005 | Kim et al. .................. 370/390 |
| 2005/0128995 A1 * | 6/2005 | Ott et al. .................. 370/349 |
| 2005/0175009 A1 * | 8/2005 | Bauer .................. 370/390 |
| 2005/0180356 A1 * | 8/2005 | Gillies et al. .................. 370/329 |
| 2005/0195799 A1 * | 9/2005 | Burne et al. .................. 370/352 |
| 2005/0198691 A1 * | 9/2005 | Xiang et al. .................. 726/3 |

(Continued)

FOREIGN PATENT DOCUMENTS

KR 2006-20886 3/2006

(Continued)

*Primary Examiner* — Bunjob Jaroenchonwanit
(74) *Attorney, Agent, or Firm* — Cha & Reiter, LLC

(57) ABSTRACT

A duplicate detection method is disclosed for reducing redundant traffic in an ad hoc network. The duplicate detection method of the present invention includes receiving a first packet having a content identifier and a subcontent identifier, storing the content identifier and the subcontent identifier of the first packet, receiving a second packet, extracting a content identifier from the second packet, determining whether the content identifiers of the first and second packets are identical, extracting, when the content identifiers are identical, a subcontent identifier from the second packet, determining whether the subcontent identifiers of the first and second packets are identical, determining, when the subcontent identifiers of the first and second packets are identical, the second packet is a duplicate of the first packet.

19 Claims, 7 Drawing Sheets

U.S. PATENT DOCUMENTS

| | | | |
|---|---|---|---|
| 2005/0232281 A1* | 10/2005 | Rosenzweig et al. | 370/400 |
| 2006/0035588 A1* | 2/2006 | Chapelle | 455/13.3 |
| 2006/0045065 A1* | 3/2006 | Kim et al. | 370/351 |
| 2006/0056369 A1* | 3/2006 | Morishige et al. | 370/338 |
| 2006/0171301 A1* | 8/2006 | Casper et al. | 370/225 |
| 2006/0209783 A1* | 9/2006 | Jain et al. | 370/349 |
| 2007/0101074 A1* | 5/2007 | Patterson | 711/156 |
| 2008/0069034 A1* | 3/2008 | Buddhikot et al. | 370/328 |
| 2010/0138856 A1* | 6/2010 | Anglin, Jr. | 725/30 |

FOREIGN PATENT DOCUMENTS

KR 2006-104061 10/2006

* cited by examiner

DUPLICATE DETECTION METHOD FOR AD HOC NETWORK

CLAIM OF PRIORITY

This application claims the benefit of the earlier filing date, pursuant to 35 USC §119, to that patent application entitled "DUPLICATE DETECTION METHOD FOR AD HOC NETWORK" filed in the Korean Intellectual Property Office on Apr. 9, 2007 and assigned Serial No. 2007-0034563, the contents of which are incorporated herein by reference.

BACKGROUND OF THE INVENTION

1. Field of the Invention

The present invention relates to a mobile ad hoc network and, in particular, to a duplicate detection method for a mobile ad hoc network.

2. Description of the Related Art

Wireless networks have become increasingly popular with the developments of mobility technologies and mobile devices. There are typically two kinds of mobile networks. The first is known as infrastructured networks with fixed nodes and the second is known as ad hoc networks that do not require any fixed infrastructure.

The infrastructured networks are based on the cellular concept and require an infrastructure including a fixed node, e.g. a base station or an access point (AP), such that two mobile nodes communicate via the fixed node. Typically, Global System for Mobile communication (GSM), Universal Mobile Telecommunications System (UMTS), Code Division Multiple Access (CDMA), Wireless Local Loop (WLL), and Wireless Local Area Network (WLAN) can be classified as infrastructured networks.

An ad hoc network, on the other hand, is a collection of mobile nodes forming a temporary network without the aid of any existing infrastructure or centralized administration. Mobile Ad Hoc Network (MANET) is a kind of wireless ad hoc network and is a self-configuring network of mobile nodes each acting as a router. Due to the mobility of the MANET, the mobile nodes may comprise any device capable of carrying out the desired operation. Even devices with limited resources such as computational power, memory, and battery capacity can be mobile nodes.

As described above, since a MANET is self-organized through mobile nodes without the aid of any existing infrastructure, it can be established flexibly in any situation. The mobile nodes are free to move randomly and organize themselves arbitrarily. Hence, the network topology may change rapidly and unpredictably. The mobile nodes act as hosts and mobile routers simultaneously in order to communicate with each other and relay data for other nodes. Thus, end nodes and relay nodes are not distinguished from each other. Since no central administrative node controls the network, the network management is distributed among the mobile nodes.

However, the MANETs suffers duplicate problem in that intermediate nodes generate duplicates of the transmitted packet while exchanging and relaying the data. For example, if a specific node broadcasts a packet, neighbor nodes receive and relayed the packet to their next hop nodes such that a target recipient node receives a plurality of duplicates of the packet from the intermediate nodes. Typically, a duplicate detection is performed in the application layer. In order to detect whether duplicates are received, a duplication detection application need be activated. However, activating the application layer for detecting the duplicates is inefficient and wastes power consuming. Accordingly, there has been a need for avoiding data duplication in MANETs.

In the conventional MANETs, the duplicate problem exists even in the unicast mode such that the recipient node receives duplicates from multiple intermediate nodes.

SUMMARY OF THE INVENTION

The present invention provides a duplicate detection method for an ad hoc network.

The duplicate detection method according to the present invention includes receiving a first packet having a content identifier and a subcontent identifier; storing the content identifier and the subcontent identifier of the first packet; receiving a second packet; extracting a content identifier from the second packet; determining whether the content identifiers of the first and second packets are identical with each other; extracting, if the content identifiers are identical with each other, a subcontent identifier from the second packet; determining whether the subcontent identifiers of the first and second packets are identical with each other; and determining when the subcontent identifiers of the first and second packets are identical with each other, the second packet is a duplicate of the first packet.

In accordance with another aspect of the present invention, the duplication detection method includes receiving a first and a second packets destined for a same destination address, each packet having a content identifier and a subcontent identifier; determining whether the content identifiers of the first and second packets are identical with each other; determining, when the content identifiers arc identical with each other, whether the subcontent identifiers of the first and second packets are identical with each other; and determining, when the subcontent identifiers are identical with each other, that the second packet is a duplicate of the first packet.

BRIEF DESCRIPTION OF THE DRAWINGS

The above and other objects, features and advantages of the present invention will be more apparent from the following detailed description in conjunction with the accompanying drawings, in which.

DETAILED DESCRIPTION OF THE INVENTION

Embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

The following definitions are only provided to enable a clear and consistent understanding of the detailed description and the claims. Unless otherwise noted, terms are to be understood according to conventional usage by those skilled in the relevant art. While the invention is shown and described with reference to certain exemplary embodiments thereof, it will be understood by those skilled in the art that various changes in form and details may be made therein without departing from the spirit and scope of the invention as defined by the appended claims.

Although the following describes aspects of the present invention in terms of an ad hoc network, it should be clear that the following also applies to other types of wireless networks in which a specific node broadcasts data and a recipient node receives the data.

For example, the duplicate detection of the present invention can be applied to the wireless networks such as Bluetooth and WI-FI networks. Accordingly, the mobile nodes of the ad hoc network may represent Bluetooth or WI-FI enabled devices, such as cellular phone, Personal Digital Assistant (PDA), Smartphone, High Speed Downlink Packet Access (HSDPA) terminal, Code Division Multiple Access (CDMA) terminal, and $3^{rd}$ generation (3G) terminals including CDMA 2000 terminal and Wideband CDMA (WCDMA) terminal.

Also, each mobile node can operate as a broadcast node, relay node, and recipient node in the ad hoc network.

In the following description, content includes various types of data and information such as User Create Contents (UCC) and Teaser Advertisements delivered in unit of packet, for example.

Figure 1:
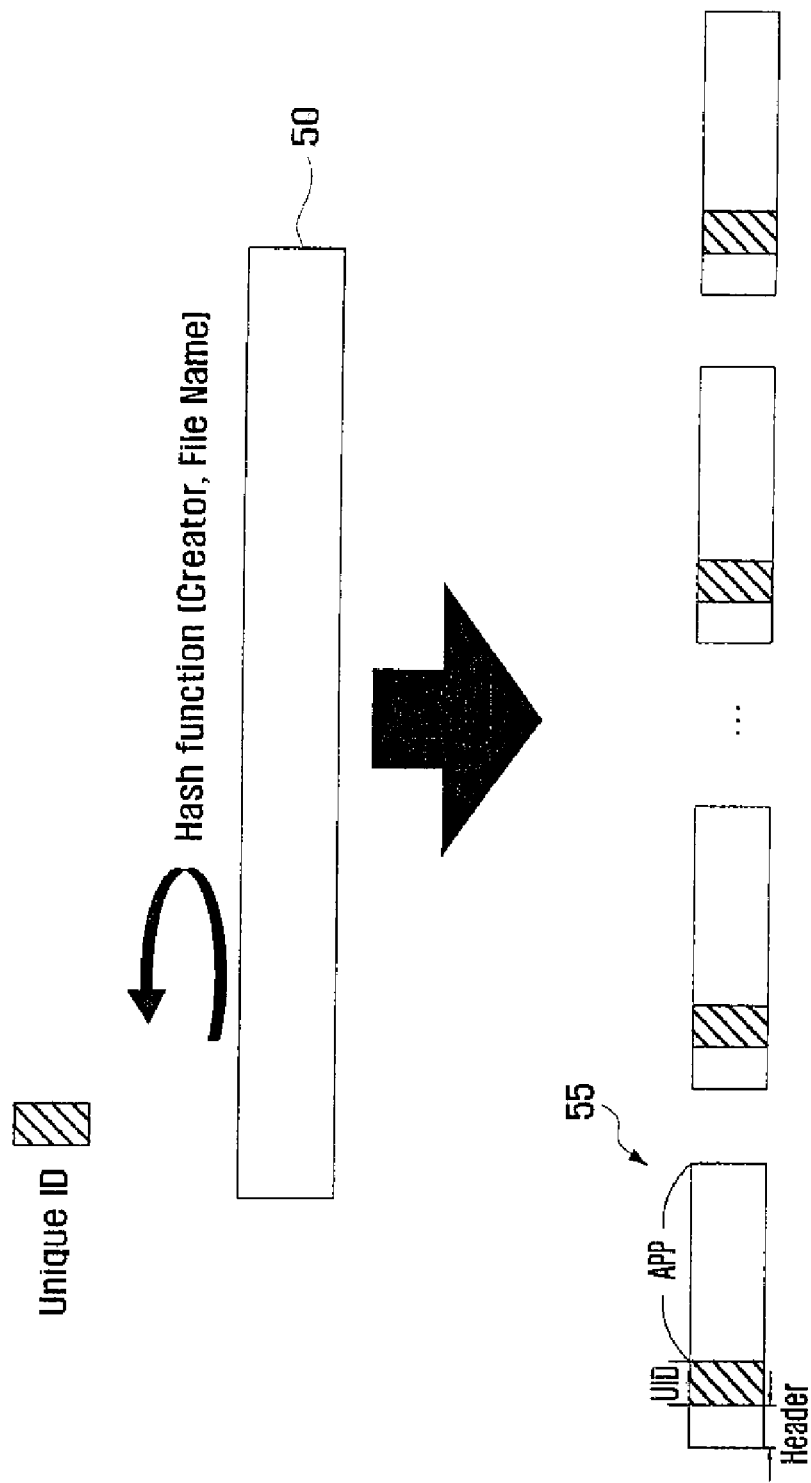
FIG. 1 is a conceptual view illustrating how a packet is formatted for a duplicate detection method according to an exemplary embodiment of the present invention.

FIG. 1 is a conceptual view illustrating how a packet is formatted for a duplicate detection according to an exemplary embodiment of the present invention.

Referring to FIG. 1, the content 50 is segmented into subcontents and packetized. Each packet 55 includes an application data field (APP), a unique identifier (UID) field, and a header field (Header). That is, the content 50 is divided into a plurality of subcontent packets 55 each having the application data, UID for indicating identical content, and Header defining the subcontent carried by the packet.

The application data field carries the subcontent obtained by dividing the content 50 and the content 50 is restored at the recipient node by combining the subcontents received with the same UID in a sequential order. The application data contained in the packet can be a part of the content 50 or the entire content 50.

The UID is used to identify the content 50 such that the subcontents originated from the same content 50 have the same UID. The UID is generated at a broadcast node 100 using a hash function. The UID field is positioned before the application data field such that a node can detect whether the packet is a duplicate without checking the application data contained in packet.

The header is formatted according to the protocol defined between the mobile nodes. In a case wherein the mobile nodes communicate on the basis of TCP/IP, an IP header is attached.

Figure 2:
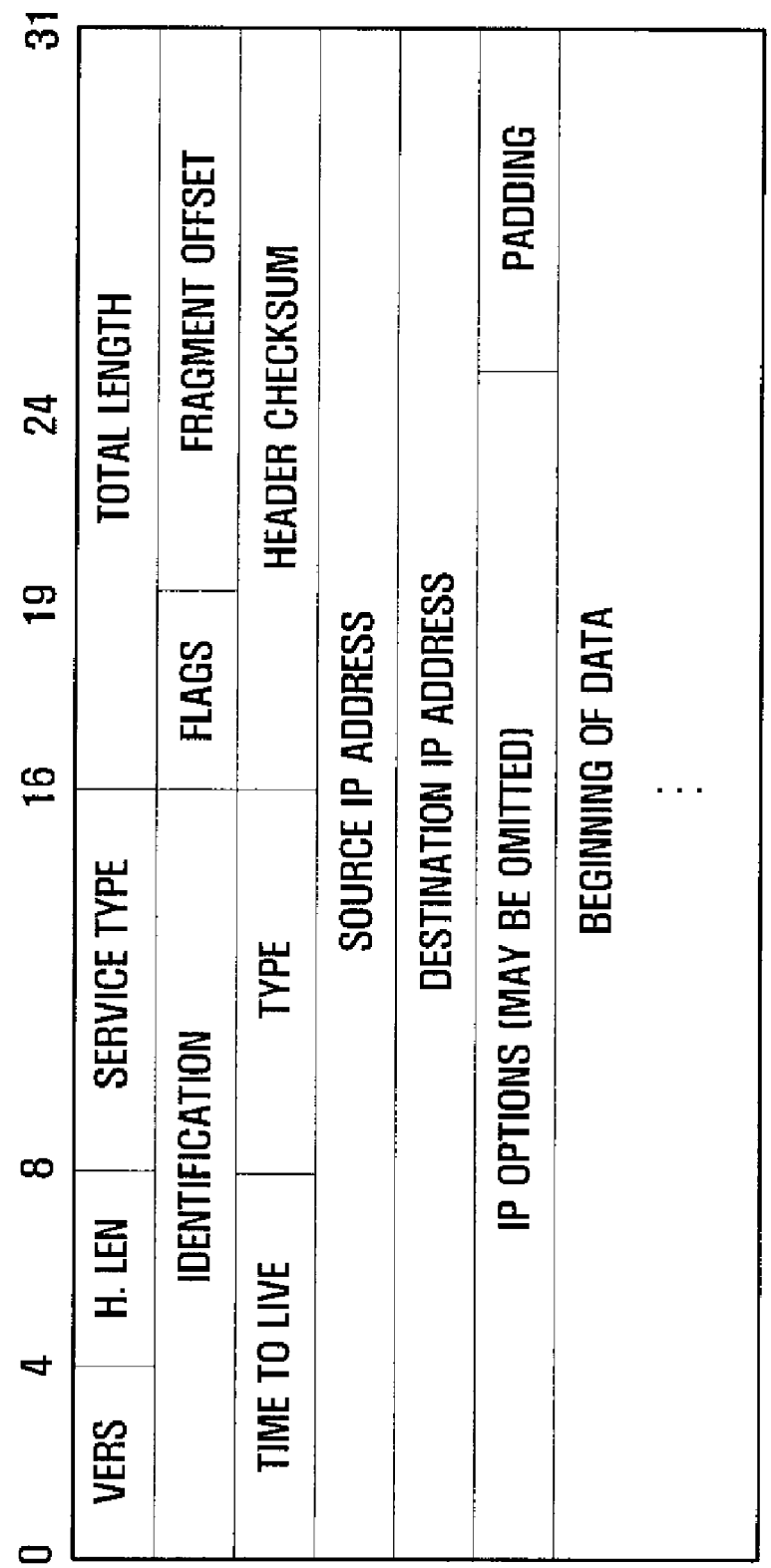
FIG. 2 is a diagram illustrating an IP packet format to be adopted for carrying content in a duplicate detection method according to an exemplary embodiment of the present invention.

FIG. 2 is a diagram illustrating an IP packet format. In a case that the ad hoc network is implemented on the basis of Internet Protocol (IP), the packet is formatted with an IP header. If the subcontent packets 55 are originated from the same content 50, the information fields of the IP headers of the packets 55 are set to the same values except for the IDENTIFICATION field and TOTAL LENGTH field. Also, the TOTAL LENGTH fields of the packets are set to the same value except for the last packet. The IDENTIFICATION field can be used as an identifier for identifying the subcontent packet 55. The DESTINATION IP ADDRESS field can be set with group IP address for a multicast or a recipient IP address for a unicast.

A duplicate detection method based on the above-structured packet format is described hereinafter in detail.

In order to simplify the explanation, the duplicate detection is described mainly with structure of the subcontent packet 55. Since the content 50 are divided into the subcontents and the content 50 is the sum of the subcontents carried by the subcontent packets 55, it is practical to explain the duplicate detection with a packet transmission procedure.

Figure 3:
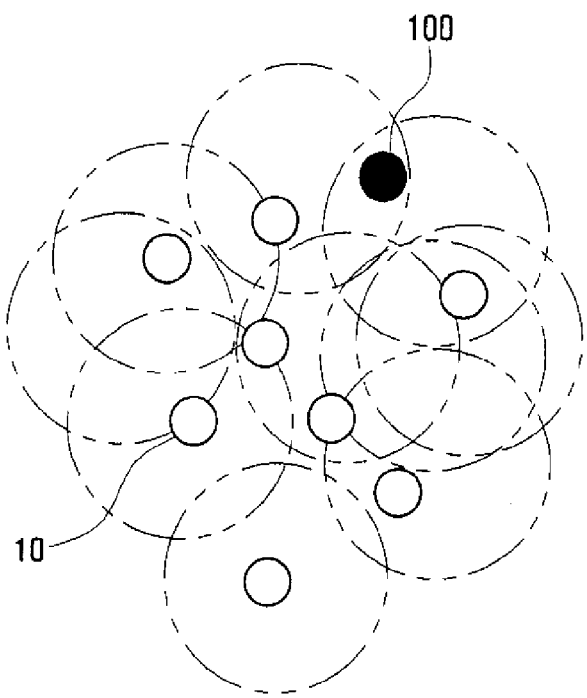
FIG. 3 is a diagram illustrating an exemplary operation of a duplicate detection for a multicast ad hoc network in a multicast environment according to an embodiment of the present invention.

FIG. 3 is a diagram illustrating an operation of a duplicate detection for a multicast ad hoc network in a multicast environment according to an exemplary embodiment of the present invention.

Referring to FIG. 3, the ad hoc network includes a broadcast node 100 that broadcasts subcontent packets 55 and a plurality of relay nodes 10 that receive the packets 55 and deliver the packets to their neighbor nodes.

The broadcast node 100 can be a specific broadcaster server that provides the content. The broadcast node 100 transmits the subcontent 55 to at least one mobile node. Here, the broadcast node 100 divides the content 50 into a plurality of subcontent, packetizes the subcontent by adding an identical UID to the subcontent packets and header as shown in FIG. 1, and then multicasts the subcontent packets 55 to destination nodes.

When a subcontent packet 55 is received, the relay node 10 stores and forwards the subcontent packet 55 to at least one neighbor mobile nodes, i.e. other relay nodes. At this time, the relay node 10 checks whether the received subcontent packet is a duplicate of an already received packet. If a duplicate is received, the relay node 10 forwards the duplicate to other relay nodes 10 and, otherwise, the relay node 10 stores and forwards the packet. That is, the relay node 10 checks the value of the IDENTIFICATION field of the packet header of the subcontent packet 55 received before expiration of a session timer, and regards the packet of which IDENTIFICATION value is identical with that of a previously received packet as a duplicate and drop the duplicate. In a case that the received subcontent packet 55 is not a duplicate, the relay node stores the subcontent packet 55.

In a case that a subcontent packet is received after expiration of the session timer, the relay node 10 compares the UID of the current subcontent packet with that of the previously received packet. If the UID of the current subcontent packet is identical with that of the previous subcontent packet, the relay node 10 discards the current subcontent packet.

Figure 4:
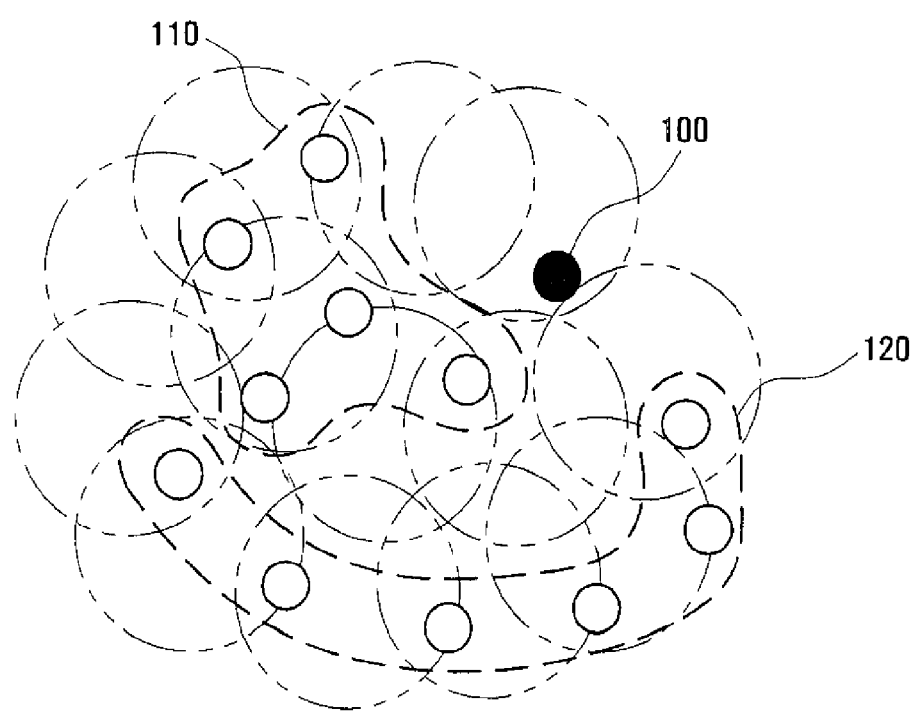
FIG. 4 is a diagram illustrating an exemplary operation of a duplicate detection for an ad hoc network according to another embodiment of the present invention.

FIG. 4 is a diagram illustrating an operation principle of a duplicate detection for an ad hoc network according to another exemplary embodiment of the present invention.

Referring to FIG. 4, the ad hoc network includes a broadcast node 100, a first relay node set 110, and a second relay node set 120.

The broadcast node 100 is configured and operates as in the embodiment depicted in FIG. 3.

The first relay node set 10 is a group of mobile nodes that have received the content 50 already. That is, the relay nodes of the first relay node set 110 have the content 50 recovered by combining the subcontent packets transmitted by the broadcast node 100. Accordingly, the nodes belonging to the first relay node set 110 have no need to receive the subcontent packets 55 again.

The second relay node set 120 is a group of mobile nodes that have not received subcontent packets associated with the content 50. That is, the second relay node set 120 is a group of the mobile nodes that may have joined then the ad hoc network after the relay nodes of the first relay node set 110 have completely received the content 50. Thus, the relay nodes of the second relay node set 120 may require receiving the content 50.

In this situation, each relay node of the first relay node set 110 checks the UID of the subcontent packets and discards the subcontent packet of which the UID is of the content 50 in spite of the reception after the session timer expiration. In more detail, each mobile node of the first relay node set 110 extracts the UID of the currently received subcontent packets and compares the UID of the current subcontent packet with that of the previously received content 50. If the UID of the current subcontent packet is identical with that of the content 50, the relay node regards the current subcontent packet as a duplicate of one of the previously received subcontent packets and discards the current subcontent packet. The mobile nodes of the first relay node set 110 can relay the current subcontent packet to the neighbor mobile nodes or can be configured to restrict relaying the duplicate.

Figure 5:
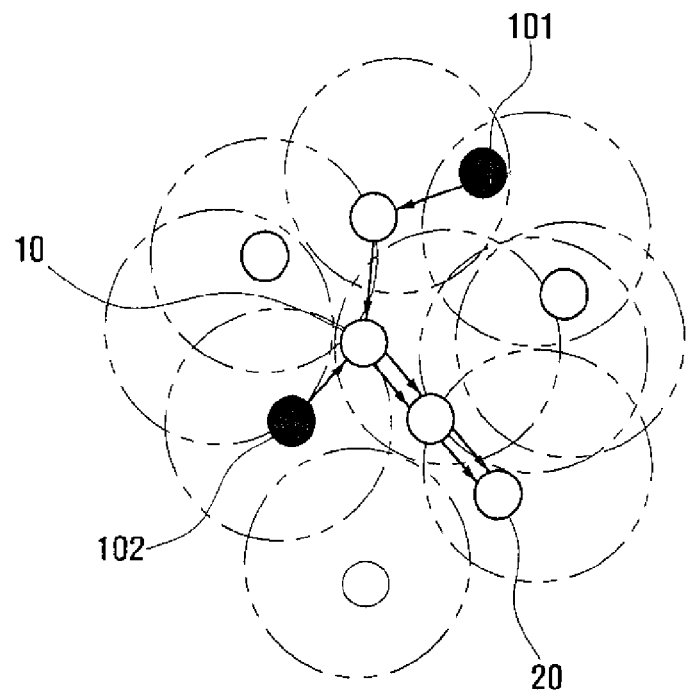
FIG. 5 is a diagram illustrating an exemplary operation of a duplicate detection for a unicast ad hoc network according to another embodiment of the present invention.

FIG. 5 is a diagram illustrating an operation principle of a duplicate detection for a unicast ad hoc network according to another exemplary embodiment of the present invention.

In this embodiment, the content 50 can be carried by a single subcontent packet 55 or a plurality of subcontent packets 55 generated by dividing the content 50 into a plurality of subcontent packets and packetizing the subcontent.

Referring to FIG. 5, the unicast ad hoc network includes a first broadcast node 101, a second broadcast node 102, a recipient node 20, and relay nodes 10.

The first broadcast node 101 transmits subcontent packets 55 to the recipient node 20. The packet header of each subcontent packet is provided with a source IP address and a destination IP address such that the subcontent packet 55 is routed to the recipient node 20 by the relay nodes 10. The subcontent packets 55 can be routed in different paths according to the change of the ad hoc network topology. The delivery path of the subcontent packet 55 is determined according to a specific routing algorithm. For example, the subcontent packet 55 is routed according to the minimum cost tree algorithm guaranteeing a loop free routing tree.

The second broadcast node 102 is a mobile node attempting to transmit the same content 50 to the same recipient node 20. Accordingly, the headers of the subcontent packets transmitted by the first and second broadcast node 101 and 102 are formatted with the same destination IP address, i.e. the IP address of the recipient node. The second broadcast node 102 also transmits the subcontent packet through a route determined by the same routing algorithm as used in the first broadcast node 101. In FIG. 5, the first and second broadcast nodes 101 and 102 share some links of their routes for transmitting the subcontent packets to the recipient node 20.

The recipient node 20 is a mobile node receiving the subcontent packet 55 transmitted by at least one of the first and second broadcast node 101 and 102. One of the relay nodes 10, or the intermediate nodes, detects whether the subcontent packets are identical with each other. If the same subcontent packets are received from the first and second broadcast nodes 101 and 102, the relay node 10 drops the latter arrived subcontent packet and forwards the early arrived subcontent packet to the recipient node 20.

The relay nodes are intermediate nodes determined according to the routing algorithm so as to establish routes from the first and second broadcast node 101 and 102 to the recipient node 20. Each relay node 10 can be configured to check the destination IP address of the subcontent packet and forwards the subcontent packet to another relay node on the route to the recipient node 20 without storing the subcontent packet. If the same subcontent packets are received from both the first and second broadcast nodes 101 and 102, the relay node 10 regards one of the subcontents as a duplicate so as to discard the duplicate. That is, if the subcontent packets 55 having the same UID are received from the first and second broadcast nodes 101 and 102, the relay node 10 forwards previously received subcontent packet 55 to the recipient node 20 and drops the later received subcontent packet as the duplicate.

Figure 6:
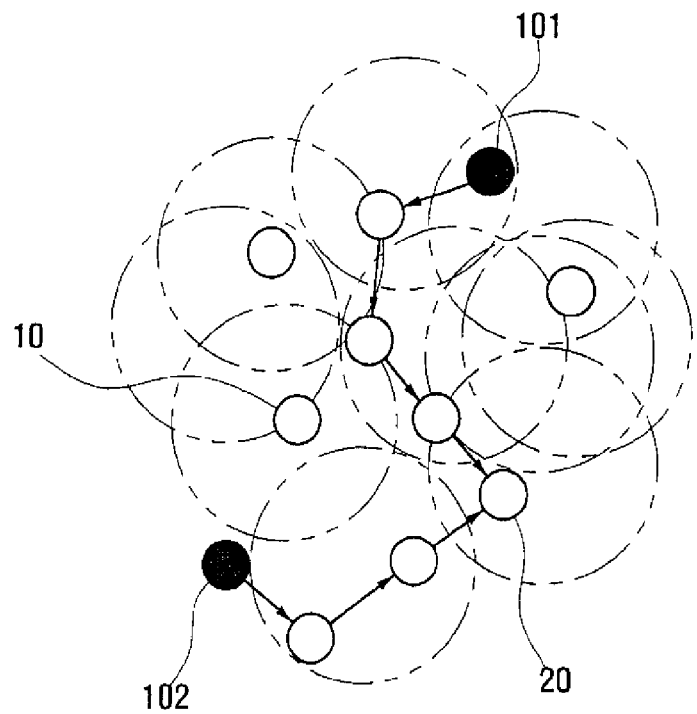
FIG. 6 is a diagram illustrating an exemplary operation of a duplicate detection for a unicast ad hoc network according to another embodiment of the present invention.

FIG. 6 is a diagram illustrating an operation principle of a duplicate detection for a unicast ad hoc network according to another exemplary embodiment of the present invention.

Referring to FIG. 6, the unicast ad hoc network includes a first broadcast node 101, a second broadcast node 102, a recipient node 20, and a plurality of relay nodes 10.

The roles and functions of the first and second broadcast nodes 101 and 102 are identical with those of the first and second broadcast nodes 101 and 102 in FIG. 5.

The recipient node 20 is a mobile node receiving the content 50 from at least one of the first and second broadcast nodes 101 and 102. If the same subcontent packets 55 are received from both the first and second broadcast node 101 and 102, the recipient node 20 can detect the duplication by checking the UIDs of the subcontent packets 55 such that the subcontent packet 55 that arrived later are dropped.

The relay nodes 10 are configured to relay the subcontent packets transmitted by the first and second broadcast nodes 101 and 102 to the next recipient node 20. In this embodiment, routes for transmitting the subcontent packet 55 from the first and second broadcast nodes 101 and 102 to the recipient node 20 have no shared link, such that the subcontent packets 55 transmitted by the first and second broadcast nodes 101 and 102 are relayed by different sets of relay nodes 10.

As described above, the duplicate detection for a unicast ad hoc network enables a relay node or a recipient node to detect a duplicate packet by checking UIDs of all subcontent packets and drop, if a duplicate packet is detected, the duplicate packet.

A duplicate suppression operation of the above-configured ad hoc network is described hereinafter in more detail.

Figure 7:
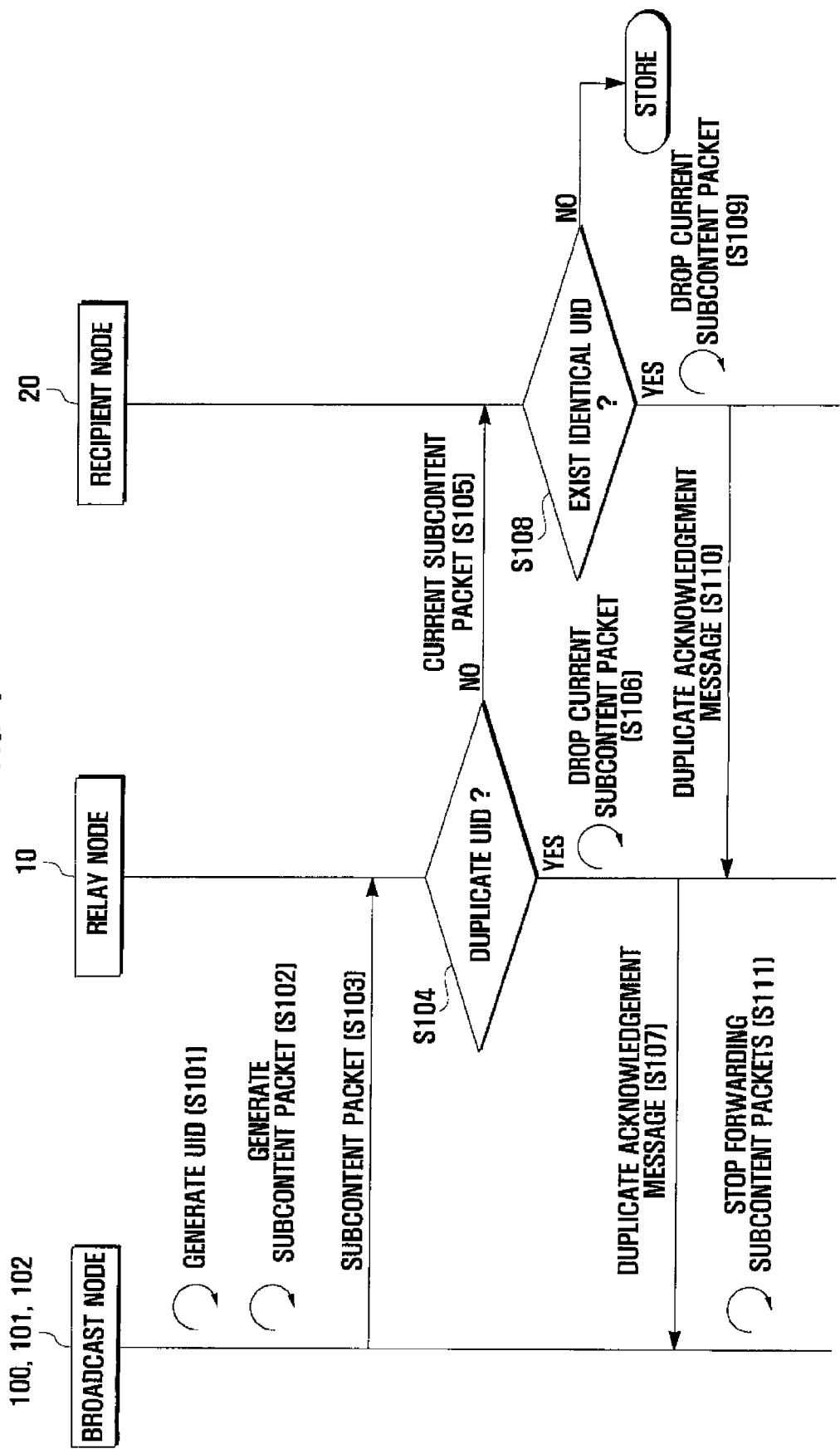
FIG. 7 is a signaling diagram illustrating a duplicate suppression operation of an ad hoc network according to an exemplary embodiment of the present invention.

FIG. 7 is a signaling diagram illustrating a duplicate suppression operation of an ad hoc network according to an exemplary embodiment of the present invention.

The content 50 can be carried by a single subcontent packet or multiple subcontent packets according to its size. In this embodiment, it is assumed that the content 50 is divided into the subcontents and then packetized to be transmitted by multiple units of subcontent packets.

Referring to FIG. 7, in response to a content request, a broadcast node 100 generates a UID for the requested content 50 (S101). The UID is a unique identifier generated using a hash function with parameters such as random number generators and file names. After generating the UID, the broadcast node 100 divides the content 50 into subcontent and packetizes the subcontent by adding headers to the subcontent packets (S102). During the packetization process, the UID is inserted between the packet header and a payload field containing the subcontent. The subcontent packets 55 originated from the same content 50 are assigned the same UID.

After generating the subcontent packets 55, the broadcast node 100 broadcasts each subcontent packet 55 (S103). If the subcontent packet 55 is received, the relay node 10 determines whether the same subcontent packet has been received in the current session (S104). If it is determined that the same subcontent packet has never been received in the current session, the relay node 10 relays the subcontent packet 55 to the recipient node 20 (S105). The duplicate packet detection can be performed by comparing the UID and the value of the identification field of the packet header of the current subcontent packet with those of the previously received subcontent packets.

If it is determined that the subcontent packet 55 is received after the expiration of the session and it is a duplicate of a previously received subcontent packet, the relay node 10 may relay the subcontent packet in consideration of a new mobile node entry into the ad hoc network.

If it is determined that the subcontent packet 55 has been received in the same session, the relay node regards the current subcontent packet as a duplicate packet and drops the duplicate packet (S106). After dropping the duplicate packet, the relay node transmits a subcontent duplicate acknowledgement message to the broadcast node (S107).

In the meantime, if a subcontent packet is received from the relay node 10, the recipient node 20 determines whether the subcontent packet has originated from the content 50 completely received already by comparing the UID of the current subcontent packet with that of the completely received content 50 (S108). If it is determined that the current subcontent packet has originated from content 50 completely received already, the recipient node 20 discards the current subcontent packet (S109) and transmits a content duplicate acknowledgement message to the relay node 10 (S110). Upon receiving the content duplicate acknowledgement message, the relay node stops forwarding the subcontent packets originated from the content 50 (S111).

The relay node 10 can be configured to transmit the content duplicate acknowledgement message, if a subcontent packet originated from the content 50 completely received already is received from the broadcast node.

Although the message flow of FIG. 7 is described with regard to a unicast environment, the duplicate suppression mechanism can be applied in a multicast environment in which all the relay nodes are recipient nodes.

Figure 8:
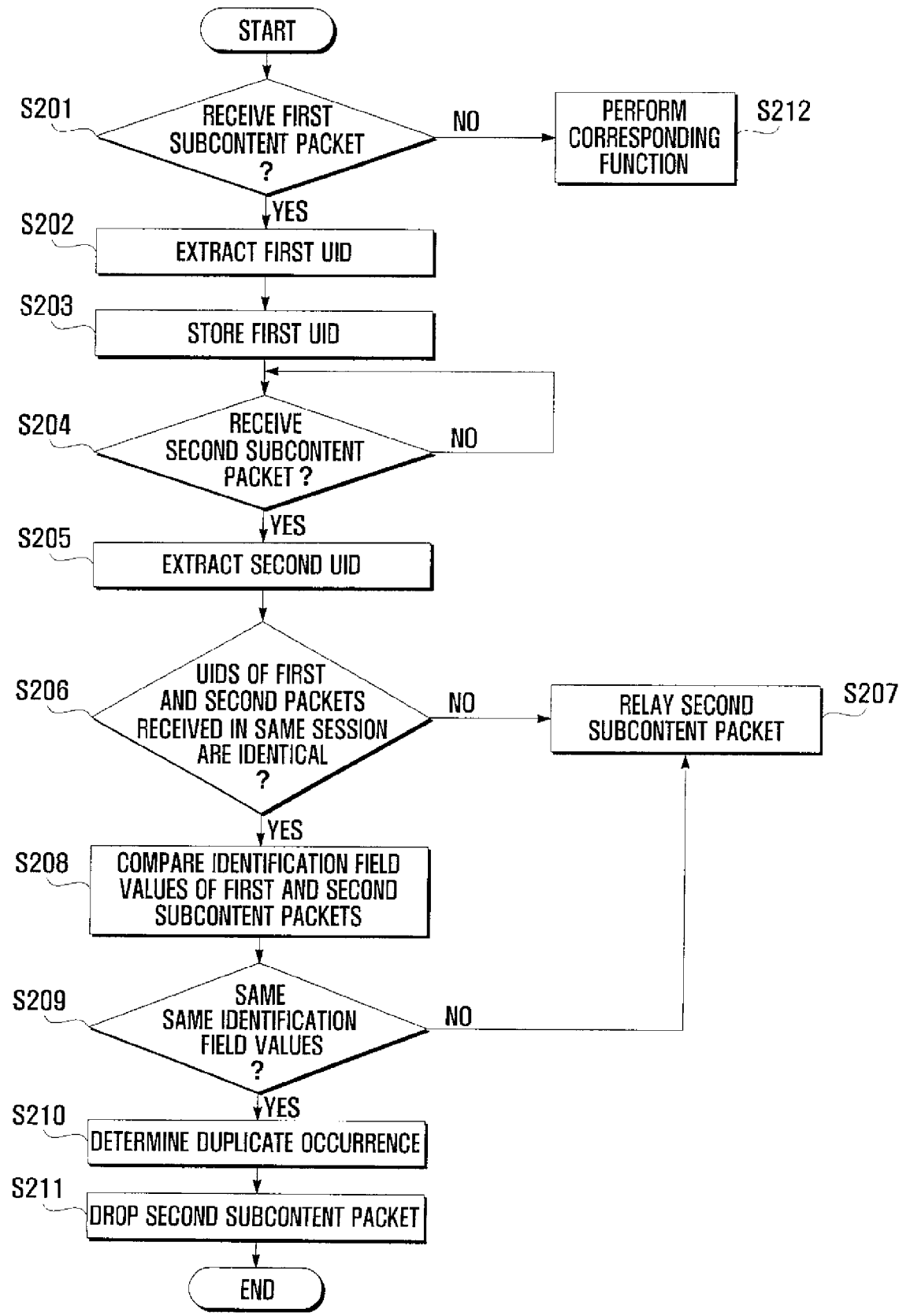
FIG. 8 is a flowchart illustrating a duplicate detection procedure of a duplicate detection according to an exemplary embodiment of the present invention.

FIG. 8 is a flowchart illustrating a duplicate detection procedure of a duplicate detection according to an exemplary embodiment of the present invention. In this embodiment, a relay node detects a duplicate of a subcontent packet in a unicast ad hoc environment.

The content 50 is assigned a UID and the subcontent carried in the subcontent packets 55 derived from the content 50 are transmitted together with the UID. The UID is added to each subcontent packet between the packet header and the application data field (APP) containing the subcontent.

The content 50 can be segmented into a plurality of subcontents according to its size. In this embodiment, it is assumed that the content 50 is divided into a plurality of subcontents and the subcontent are packetized in order to be transmitted. Also, the relay node 10 relays the subcontent packets 55 to another relay node or recipient node without storing the subcontent packets by itself.

Referring to FIG. 8, the relay node 10 determines whether a first subcontent packet is received (S201). If a first subcontent packet is received, the relay node extracts a UID of the first subcontent packet (S202) and stores the extracted UID (S203). If a first subcontent packet is not received, the relay node 10 maintains a previously activated function, for example a voice communication function (S212).

After storing the UID, the relay node 10 determines whether a second subcontent packet is received (S204). If a second subcontent packet is received, the relay node 10 checks the UID of the second subcontent packet (S205) and determines whether the first and second subcontent packets are received in a same session and the UIDs of the first and second subcontent packets are identical with each other (S206). It the first and second subcontent packets are not received in the same session or the UIDs of the first and second subcontent packets are not identical with each other, the relay node 10 relays the second sub content packet to another relay node or recipient node (S207).

If the first and second subcontent packets are received in the same session and the UIDs of the first and second subcontent packets are identical with each other at step S206, the relay node 10 compares the values (identifier) of the IDENTIFICATION fields of the headers of the first and second subcontent packets (S208) and determines the identifiers of the first and second packets are identical with each other (S209).

When the identifiers of the first and second packets are identical with each other, the relay node 10 regards the second subcontent packet as a duplicate of the first subcontent packet (S210) and drops the second subcontent packet (S211). If the identifiers of the first and second packets differ from each other, the relay node 10 relays the second subcontent packet to another relay node or recipient node (S207).

The relay node 10 can be configured to transmit a duplicate acknowledgement message to the node that transmitted the duplicate when the duplicate is detected.

In a case of the ad hoc network that operates in a multicast environment, the relay node 10 stores the second subcontent packet. Also, the relay node 10 can be configured to relay, if the second subcontent packet is identical with the previously received and stored first subcontent packet, the second subcontent packet to another relay node or the recipient node without storing in the memory. Also, the relay node can be configured to discard the second subcontent packet, when the first and second subcontent packets are received in the same session and identical with each other.

Figure 9:
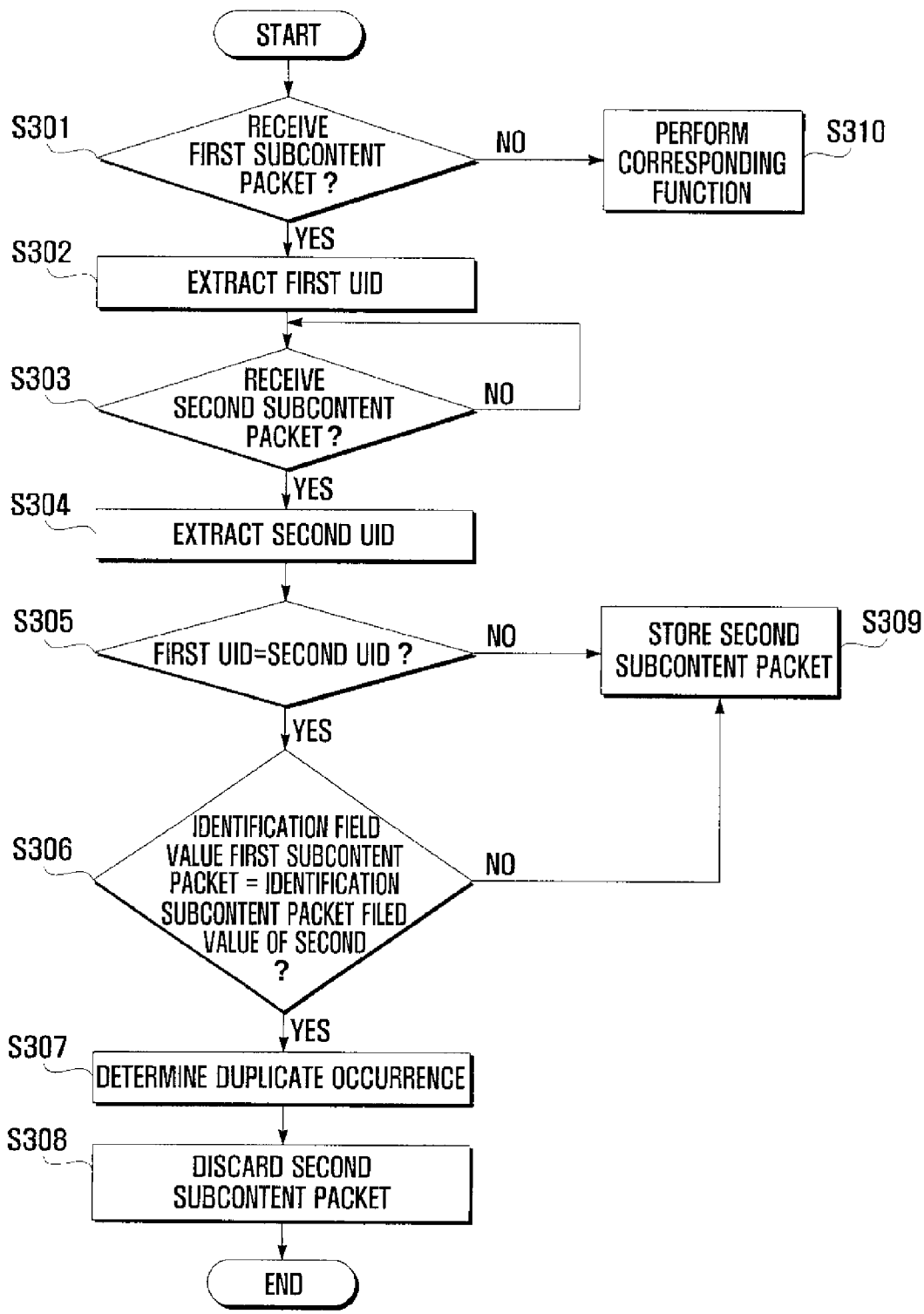
FIG. 9 is a flowchart illustrating a duplicate detection method according to another exemplary embodiment of the present invention.

FIG. 9 is a flowchart illustrating a duplicate detection method according to another exemplary embodiment of the present invention. In this embodiment, a recipient node detects a duplicate of a subcontent packet in a unicast ad hoc environment.

Referring to FIG. 9, the recipient node 20 determines whether a first subcontent packet is received (S301). A first subcontent packet is received, the relay node extracts a UID of the first subcontent packet (S302) and determines whether a second subcontent packet is received (S303). When a second subcontent packet is received, the recipient node 20 checks the UID of the second subcontent packet (S304) and determines whether the UIDs of the first and second subcontent packets (S305). If a first subcontent packet is not received at step S301, the relay node 10 maintains previously activated function, for example a voice communication function (S310).

If the UIDs of the first and second subcontent packets are the same, the recipient node 20 determines whether the identifiers of the first and second subcontent packets are identical with each other (S306). If the identifiers of the first and second subcontent packets are identical with each other, the recipient node 20 determines that the second subcontent packet is a duplicate of the first subcontent packet (S307) and drops the second subcontent packet (S308). If the identifiers of the first and second subcontent packets differ from each other, the recipient node 20 determines that the second subcontent packet carries a subcontent different from that carried by the first subcontent packets and stores the second subcontent packet (S309).

Here, the recipient node 20 can be configured to transmit a duplicate acknowledgement message to the relay node 10 or the broadcast node 100 when the second subcontent packet is determined as a duplicate of the first subcontent packet.

As described above, the duplicate detection of the present invention for an ad hoc network enables a relay node and/or a recipient node to detect if a duplicate is received by comparing UIDs and IDENTIFICATION field values of incoming subcontent packets, the UID being used for identifying a specific content and the IDENTIFICATION field values being used for identifying subcontents originated from the same content.

In a case that a duplicate subcontent packet is detected, the relay node or the recipient node drops the duplicate subcontent packet and acknowledges the duplicate detection to its transmission node, thereby reducing redundant traffic in the ad hoc network. Also, the duplicate detection method of the present invention enables the relay nodes to just relay the duplicate subcontent packet arrived after expiration of a broadcast session, thereby maintaining broadcast characteristic of the ad hoc network.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be rendered in such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

As described above, the duplicate detection method of the present invention is advantageous in reduction of unnecessary packet retransmission and redundant traffic in ad hoc networks.

What is claimed is:

1. A duplicate detection method for an ad hoc network, comprising:
receiving by a mobile node of the ad hoc network a first packet broadcast by a broadcast node via a relay node, said first packet having a content identifier and a subcontent identifier generated by the broadcast node;
storing by the mobile node the content identifier and the subcontent identifier of the first packet in a machine-readable storage medium; receiving by the mobile node a second packet from another relay node;
extracting by the mobile node a content identifier from the second packet;
determining by a controller of the mobile node whether the content identifiers of the first and second packets are identical with each other;
extracting by the mobile node, when the content identifiers of the first and second packets are identical with each other, a subcontent identifier from the second packet;
determining by the controller of the mobile node, whether the subcontent identifiers of the first and second packets are identical with each other;
determining by the controller of the mobile node, when the subcontent identifiers of the first and second packets are identical with each other, the second packet is a duplicate of the first packet; and
said controller of the mobile node performing at least one of storing, relaying or discarding the second packet according to a predetermined response after the mobile node determines that the second packet is a duplicate of the first packet without checking application data contained in the second packet,
wherein each mobile node is functional as a broadcast node, relay node, and recipient node in the ad hoc network, and
when the controller of the mobile node determines that subcontent identifiers of the first and second packets are identical with each other, and the second packet is received after a current session has expired, said subcontent of the second packet is relayed in the event that a new mobile node has entered the ad hoc network, otherwise discards said second packet.

2. The duplicate detection method of claim 1, further comprising determining by the controller of the mobile node whether the first and second packets have arrived within a same session.

3. The duplicate detection method of claim 2, further comprising relaying by the mobile node the second packet, when the first and second packets are arrived in the same session.

4. The duplicate detection method of claim 1, further comprises: storing in a storage the second packet by the mobile node, when the content identifiers of the first and second packets are different; and the mobile node relaying the second packet.

5. The duplicate detection method of claim 4, wherein the second packet is a multicast packet to be transmitted to multiple recipient nodes.

6. The duplicate detection method of claim 4, wherein the second packet is a unicast packet to be transmitted to another mobile node.

7. The duplicate detection method of claim 1, wherein the subcontent identifier is information carded by a header of the packet.

8. The duplicate detection method of claim 7, wherein the packet is an Internet protocol (IP) packet.

9. The duplicate detection method of claim 1, further comprising the mobile node providing an acknowledging message to the broadcast node that the second packet is a duplicate of the first packet that has been previously received by the mobile node when the subcontent identifiers of the first and second packets are identical with each other.

10. The duplicate detection method of claim 1, wherein the packet comprises: an application data field containing one subcontent generated by segmenting a content; a unique identifier field containing the content identifier assigned for the content; and a header for defining the packet.

11. The duplicate detection method of claim 10, wherein the content identifier is assigned for the packets carrying the subcontents originated from the same content.

12. A duplication detection method for an ad hoc network, comprising:

receiving by a relay node a first and a second packet destined for a same destination address, each packet having a content identifier and a subcontent identifier generated by and transmitted to the relay node by a broadcast node;

determining by a controller of the relay node whether content identifiers of the first and second packets are identical;

determining by the controller of the relay node whether the subcontent identifiers of the first and second packets are identical with each other, when the content identifiers are identical; and determining by the controller of the relay node that the second packet is a duplicate of the first packet when the subcontent identifiers are identical with each other without checking application data contained in the second packet, wherein each mobile node is functional as a broadcast node, relay node, and recipient node in the ad hoc network, and when the controller of the mobile node determines that subcontent identifiers of the first and second packets are identical with each other, and the second packet is received after a current session has expired, said subcontent of the second packet is relayed in the event that a new mobile node has entered the ad hoc network, otherwise discards said second packet.

13. The duplicate detection method of claim 12, wherein each packet is a unicast packet.

14. The duplicate detection method of claim 12, wherein the subcontent identifier is provided in a header of the packet.

15. The duplicate detection method of claim 14, wherein the packet is an Internet protocol (IP) header.

16. The duplicate detection method of claim 12, wherein the packet comprises: an application data field containing a subcontent generated by segmenting a content; a unique identifier field containing the content identifier assigned for the content; and a header for defining the packet.

17. The duplicate detection method of claim 16, wherein the content identifier is assigned for the packets carrying the subcontents originated from the same content.

18. The duplicate detection method of claim 1, wherein a plurality of different subcontent packets originating from the same content are assigned the same content identifier by the broadcast node of the ad hoc network.

19. The duplicate detection method of claim 12, wherein the relay node performs at least one of (a) acknowledging to a broadcasting node that the second packet is a duplicate of the first packet when the subcontent identifiers of the first and second packets are identical with each other or (b) discarding the second packet when the subcontent identifiers are identical, and wherein a plurality of different subcontent packets originating from the same content are assigned the same content identifier by the broadcast node of the ad hoc network.

* * * * *